April 16, 1957 B. N. PIERCE 2,788,760
BELT AND PULLEY GUARD FOR SEWING MACHINES
Filed Aug. 23, 1954
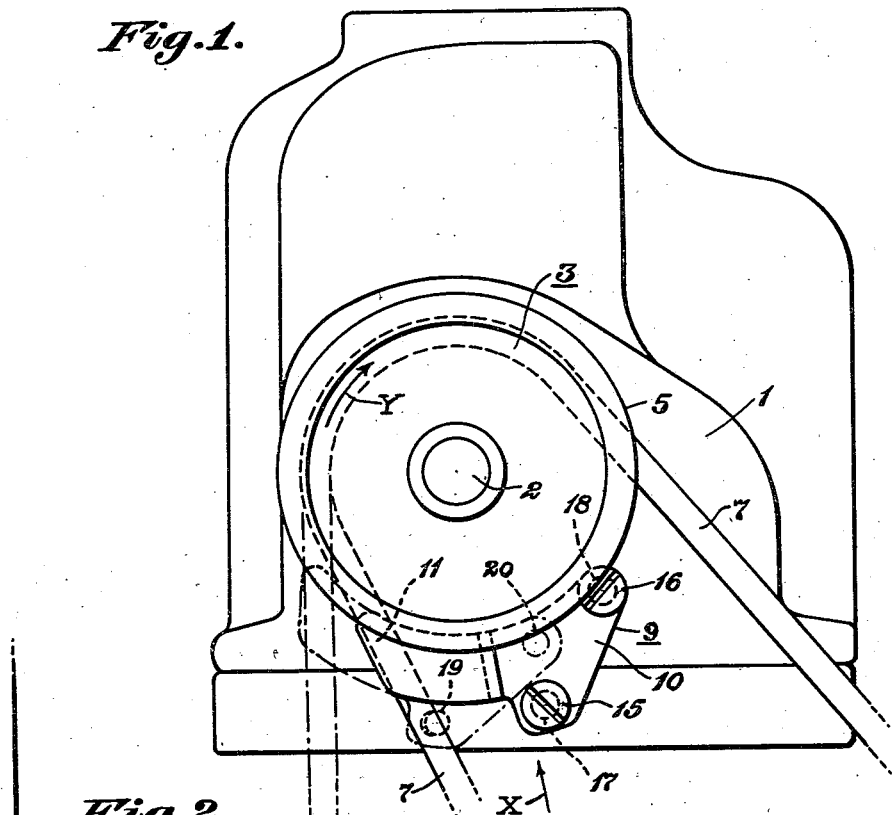
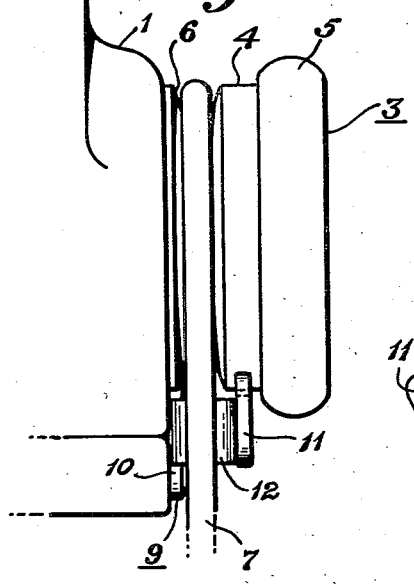
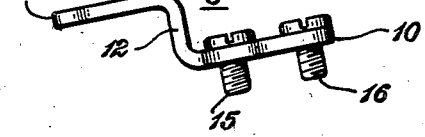
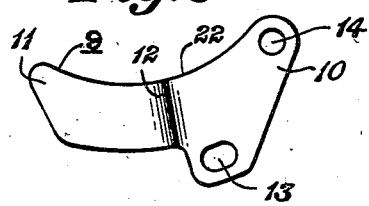
Inventor:
Bernard N. Pierce
By
His Attorneys

United States Patent Office  2,788,760
Patented Apr. 16, 1957

2,788,760

BELT AND PULLEY GUARD FOR SEWING MACHINES

Bernard N. Pierce, West Hartford, Conn., assignor to The Merrow Machine Company, Hartford, Conn., a corporation of Connecticut Application August 23, 1954, Serial No. 451,581

5 Claims. (Cl. 112—261)

This invention relates to a guard for a sewing machine pulley driven by a belt which is in proximity to a part of the pulley which an operator grasps when desiring to actuate the machine manually.

An extensively employed type of drive pulley comprises a belt receiving rim and a hand wheel rim adjacently formed on a single element provided for rotating the main shaft of a machine. In a pulley of this type, the belt rim rotates in a plane between the machine frame and the hand wheel rim. Thus located, a belt and its pulley are not conspicuously dangerous, but they offer no positive assurance against injury to an operator's hand if the hand is carelessly applied to the hand wheel rim. When an operator grasps and turns the hand wheel, the finger tips are moved in proximity to the point at which the power driven belt passes onto the rim of the pulley, and there is danger that the fingers may be moved too far over the pulley rim and caught under the advancing belt. If this happens, through inadvertence of the operator, while the machine is power driven, the resulting injury may be serious.

Various guards have been designed heretofore as protection against such injuries, but these guards have been rather cumbersome and are otherwise objectionable in that they must be dismounted from the machine frame or other support when a belt is to be applied or removed from the pulley. As a result of this inconvenience, guards taken off often are not replaced and in this manner their purpose is frequently defeated.

It is an object of the present invention to provide a belt and pulley guard of inconspicuous size that is effective to prevent injury to an operator.

Another object of the invention is to provide a belt and pulley guard which is effective in different positions on a machine to which it may be secured with respect to a pulley to compensate for various angles from which the driving belt may be led to the pulley.

A further object of the invention is to provide a belt and pulley guard which permits application or removal of a belt from the pulley without dismounting the guard from the machine frame or other support to which it may be attached.

These and other objects are obtained by providing a guard comprising a one-piece metal unit having a pair of laterally offset arms. One of the arms is provided with means by which the guard may be secured to the machine frame, while the other arm is offset so as to lie in a plane between the hand wheel rim and the belt rim of the pulley. The guard is mounted on the frame so that the offset arm overlies the point at which the driving belt moves into driving relationship with the pulley.

These and other objects and advantages will become apparent to those skilled in the art by reference to the following specification and accompanying drawings.

In the drawings:

Fig. 1 is an elevation of the pulley end of a sewing machine frame showing the improved pulley guard;

Fig. 2 is a front side elevation of the parts shown in Fig. 1;

Fig. 3 is a detail view of the guard; and

Fig. 4 is a bottom view of the guard and attaching screws as seen looking in the direction indicated by arrow X in Fig. 1.

Journaled in machine frame 1 is a main driving shaft 2 having secured thereto driving element 3. This driving element comprises a pulley rim 4 and a hand wheel rim 5. Pulley rim 4 is grooved as at 6, the groove as shown being of V-form to receive a belt 7. The plane of movement of belt 7, as the belt passes in driving relation over pulley rim 4, is between the end of machine frame 1 and hand wheel rim 5, and between this plane and hand wheel rim 5, the longitudinal extent of the pulley may be made of a width appropriate to suitably space the hand wheel rim 5 laterally from belt groove 6.

A guard 9, as shown, comprises a single plate of suitable material that, in its flatwise extent, is of approximately Z-form (see Fig. 4) with its arms 10 and 11 offset in substantially parallel planes and connected by an intermediate section 12. Arm 10 of this plate 9 has holes 13 and 14 formed therein to receive respectively screws 15 and 16 by which the plate may be secured to machine frame 1, said screws engaging the machine frame respectively in threaded holes 17 and 18 to locate the plate 9 in one position or respectively in holes 19 and 20 to locate the plate in another position. In the position in which plate 9 is held as shown by screws 15 and 16 in Fig. 1, arm 11 is carried by intermediate section 12 and extends from the intermediate section to terminate over or slightly beyond the area where belt 7 passes into groove 6 as shown by full lines indicating the belt in Fig. 1. When plate 9 is thus secured to machine frame 1, in either of the positions indicated above, the intermediate section 12 of the Z-form of guard 9 extends across the plane of movement of belt 7 to suitably locate the laterally offset arm 11 where it is effective to bar access to the area where belt 7 passes onto its pulley.

For manually rotating driving element 3, an operator grasps hand wheel rim 5 between fingers of his right hand, thus bringing some of the fingers adjacent to or against guard 9 either opposite arm 10 or arm 11. In either case, as the fingers move with the hand wheel in the normal or preferred direction of rotation indicated by arrow Y (see Fig. 1), they will pass over and along arm 11 beyond the area where injury could come from entrance of the fingers between belt 7 and pulley groove 6 were the guard not provided. This relatively small area between belt and pulley is the critical danger point because the two surfaces within the area, that of the pulley and the belt, move into pinching engagement when the pulley is rotated. Elsewhere on the belt or pulley in the vicinity of the hand wheel, moving surfaces do not converge toward each other in the direction of their travel, or are unopposed by another moving surface. Inasmuch as these surfaces are comparatively smooth, they may be touched by the fingers without serious consequence. For this reason, guard 9 as shown is of adequate size; that is, desirably small.

A belt for actuating a sewing machine may be driven by an individual motor or unit drive or by a line shaft from which power is derived for actuating a plurality of machines. In a unitary driving arrangement, a belt as 7 would pass into a pulley groove as 6 at about the angle shown by full lines indicating the belt 7 in Fig. 1, while from a line shaft driving arrangement the belt angle would be approximately that indicated by the belt 7 as shown in dot-and-dash lines in Fig. 1. For taking care of this difference that may occur in the angle of approach of belt 7 to pulley groove 6, provision is made for securing guard 9 in correspondingly appropriate positions on machine frame 1. To provide for this changeability of guard 9 from one position to another, machine frame 1, as above stated, has formed therein two sets of tapped holes, one set comprising holes 17 and 18 and the other set comprising holes 19 and 20. Hole 13 in guard 9 is elongated slightly so that the guard may easily be matched to either set of holes 17 and 18 or 19 and 20 in the machine frame.

In its lateral extent, guard 9 is only about one-half the width of driving element 3, the inner edge 22 of the guard being curved to lie closely adjacent the underside of the peripheral surface of pulley rim 4, and the entire outline of the element is within limits that render it inconspicuous and of no detriment to the pleasing symmetry of the hand wheel and adjacent contour of the machine frame.

The belt guard is so designed that the arm 11 extends but a slight distance beyond the point at which the belt moves into advancing engagement with the pulley, and therefore presents no obstacle to the removal of the belt. When the belt is slackened a sufficient amount to allow it to be disengaged from the pulley, the belt may also be passed around the outermost end of the belt guard, thus obviating the need for dismounting the guard in order to change the belt. Once the belt guard has been mounted upon the frame of the machine, there is no need whatsoever to remove the guard at any time until the means which drives the belt is changed from one driving arrangement to another driving arrangement which causes the belt to move onto the driving pulley from a different angle.

While I have disclosed but one embodiment of my invention, it will be apparent to those skilled in the art that my novel pulley guard is susceptible to modifications. Therefore, I do not intend to limit myself to the specific embodiment which has been disclosed, but consider my invention to be limited only by the scope of the following claims.

What I claim is:

1. In a sewing machine having a frame, a shaft journaled in said frame, a pulley fixed to said shaft, a belt engaging said pulley for driving said pulley in one direction of rotation, and a hand wheel mounted on a side surface of said pulley; a guard comprising a first arm portion for attachment to said frame, and a second arm portion integral with and laterally offset from said first arm portion and extending from said first arm portion to a position between said hand wheel and said belt at the point where said belt moves into driving engagement with said pulley when said pulley is driven in said one direction of rotation, said second arm portion terminating over said point whereby said belt may be removed from said pulley without dismounting said guard from said pulley.

2. In a sewing machine having a frame, a shaft journaled in said frame, a pulley fixed to said shaft, a belt engaging said pulley for driving said pulley in a preferred direction of rotation, and a hand wheel mounted on a side surface of said pulley; a belt guard having a first arm portion, means for mounting said first arm portion at a selected one of a plurality of predetermined positions upon said frame, a second arm portion integral with and laterally offset from said first arm portion, said predetermined positions being so located that said second arm portion may be positioned between said hand wheel and said belt at the point where said belt moves into driving engagement with said pulley when said pulley is driven in said preferred direction of rotation when said point of driving engagement is varied.

3. In a sewing machine, a frame, a shaft journaled in said frame, a rotary driving element mounted on said shaft provided with a pulley periphery and a hand wheel periphery, a belt in driving relationship with said pulley periphery adapted to be driven in a plane between said hand wheel periphery and said machine frame, and a belt guard comprising a pair of laterally opposed arms connected by an intermediate section, one of said arms being secured to said frame adjacent said driving element, said intermediate section extending laterally from said one arm across said plane, the other arm extending from said intermediate section along the periphery of said driving element between said pulley periphery and said hand wheel and terminating adjacent to the point where said belt passes into driving relationship with said pulley periphery.

4. In a sewing machine having a frame, a shaft journaled in said frame, a pulley fixed to said shaft, a belt engaging said pulley for rotating said pulley, and a hand wheel mounted on a side surface of said pulley; a belt guard comprising a first arm portion having means for attachment to said frame, and a second arm portion laterally offset from said first arm portion and extending between said hand wheel and said belt at the point where said belt moves into driving engagement with said pulley, said second arm portion terminating at an edge which is in substantial alignment with the outer surface of said belt at said point.

5. In a sewing machine having a frame, a shaft journaled in said frame, a pulley fixed to said shaft, a belt engaging said pulley for normally driving said pulley in one direction of rotation, and a hand wheel mounted on a side surface of said pulley; a guard comprising a first arm portion having means for attachment to said frame, an intermediate portion integral with said first arm portion and extending outwardly from said frame, a second arm portion integral with said intermediate portion at the outermost end thereof, said second arm portion extending from said intermediate portion to a point between said hand wheel and said belt at which said belt moves into driving engagement with said pulley when said pulley is driven in said one direction of rotation.

References Cited in the file of this patent

UNITED STATES PATENTS

| | | |
|---|---|---|
| 703,942 | Miller et al. | July 1, 1902 |
| 965,335 | Rosenbloom et al. | July 26, 1910 |
| 1,080,828 | Halterman | Dec. 9, 1913 |
| 1,400,131 | Adams | Dec. 13, 1921 |
| 2,295,582 | Ingwer | Sept. 15, 1942 |
| 2,363,353 | Parker | Nov. 21, 1944 |

FOREIGN PATENTS

| | | |
|---|---|---|
| 407,575 | Germany | Dec. 25, 1923 |